US012677253B2

(12) United States Patent
Hong

(10) Patent No.: US 12,677,253 B2
(45) Date of Patent: Jul. 7, 2026

(54) CAUSE DETERMINATION METHOD AND APPARATUS, AND CAUSE INDICATION METHOD AND APPARATUS

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 318 days.

(21) Appl. No.: 18/288,353

(22) PCT Filed: Apr. 30, 2021

(86) PCT No.: PCT/CN2021/091720
§ 371 (c)(1),
(2) Date: Oct. 25, 2023

(87) PCT Pub. No.: WO2022/227075
PCT Pub. Date: Nov. 3, 2022

(65) Prior Publication Data
US 2024/0224228 A1      Jul. 4, 2024

(51) Int. Cl.
*H04W 52/02* (2009.01)
*H04W 68/00* (2009.01)
*H04W 68/02* (2009.01)
*H04W 68/12* (2009.01)

(52) U.S. Cl.
CPC .................................. *H04W 68/02* (2013.01)

(58) Field of Classification Search
CPC ... H04W 68/005; H04W 68/02; H04W 76/27; H04W 8/183

USPC .......................................................... 455/458
See application file for complete search history.

(56) References Cited

U.S. PATENT DOCUMENTS

| | | | | |
|---|---|---|---|---|
| 2019/0357172 A1 | 11/2019 | Park et al. | | |
| 2023/0007624 A1* | 1/2023 | Murray | .............. | H04W 68/005 |
| 2023/0345417 A1* | 10/2023 | Wu | ........................ | H04W 68/00 |
| 2023/0362885 A1* | 11/2023 | Fan | ..................... | H04W 68/005 |

FOREIGN PATENT DOCUMENTS

| | | |
|---|---|---|
| CN | 110324893 A | 10/2019 |
| WO | WO 2020106611 A1 | 5/2020 |
| WO | WO 2021043113 A1 | 3/2021 |
| WO | WO 2021060893 A1 | 4/2021 |
| WO | WO 2021066562 A1 | 4/2021 |

OTHER PUBLICATIONS

IP.com search history (Year: 2025).*

(Continued)

*Primary Examiner* — Moustapha Diaby
(74) *Attorney, Agent, or Firm* — Cozen O'Connor

(57) ABSTRACT

A method for determining a paging cause is performed by a base station in a Radio Access Network (RAN) notification area (RNA) where a terminal in an inactive state is located. The method includes: receiving communication information from a core network that needs to be sent to the terminal; and on the basis of the communication information, determining a paging cause for paging the terminal. The terminal may include more than one subscriber identity module (SIM) cards.

19 Claims, 7 Drawing Sheets

(56) References Cited

OTHER PUBLICATIONS

European Patent Application No. 21938549.9 Search Report dated Dec. 19, 2024, 13 pages.
3rd Generation Partnership Project; Technical Specification Group Services and System Aspects; Study on system enablers for devices having multiple Universal Subscriber Identity Modules (USIM) (Release 17), 3GPP TR 23.761 Jun. 2021, 111 pages.
VIVO, "Discussion on Multi-SIM devices solutions" 3GPP TSG-RAN WG3 Meeting #110 e, R3-206281, Nov. 2020, 11 pages.
PCT/CN2021/091720 International Search Report dated Feb. 9, 2022, 2 pages.
3GPP "Technical Specification Group Services and System Aspects; Study on system enablers for devices having multiple Universal Subscriber Identity Modules (USIM) (Release 17)", 3GPP TR 23.761, No. V1.2.0, Nov. 28, 2020 (Nov. 28, 2020), 108 pages.

\* cited by examiner

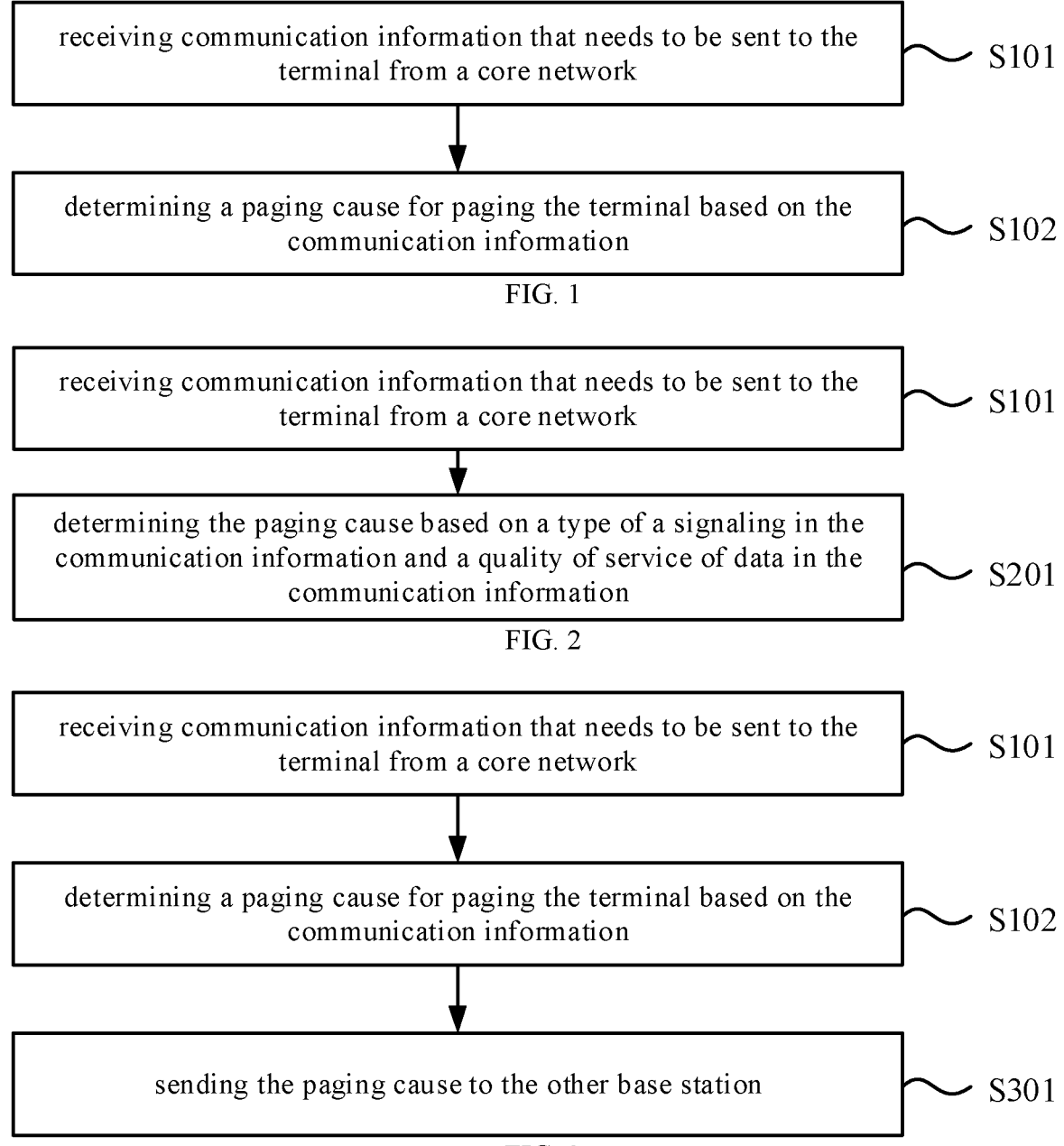

receiving communication information that needs to be sent to the terminal from a core network — S101 determining a paging cause for paging the terminal based on the communication information — S102

FIG. 1 receiving communication information that needs to be sent to the terminal from a core network — S101 determining the paging cause based on a type of a signaling in the communication information and a quality of service of data in the communication information — S201

FIG. 2 receiving communication information that needs to be sent to the terminal from a core network — S101 determining a paging cause for paging the terminal based on the communication information — S102 sending the paging cause to the other base station — S301

FIG. 3

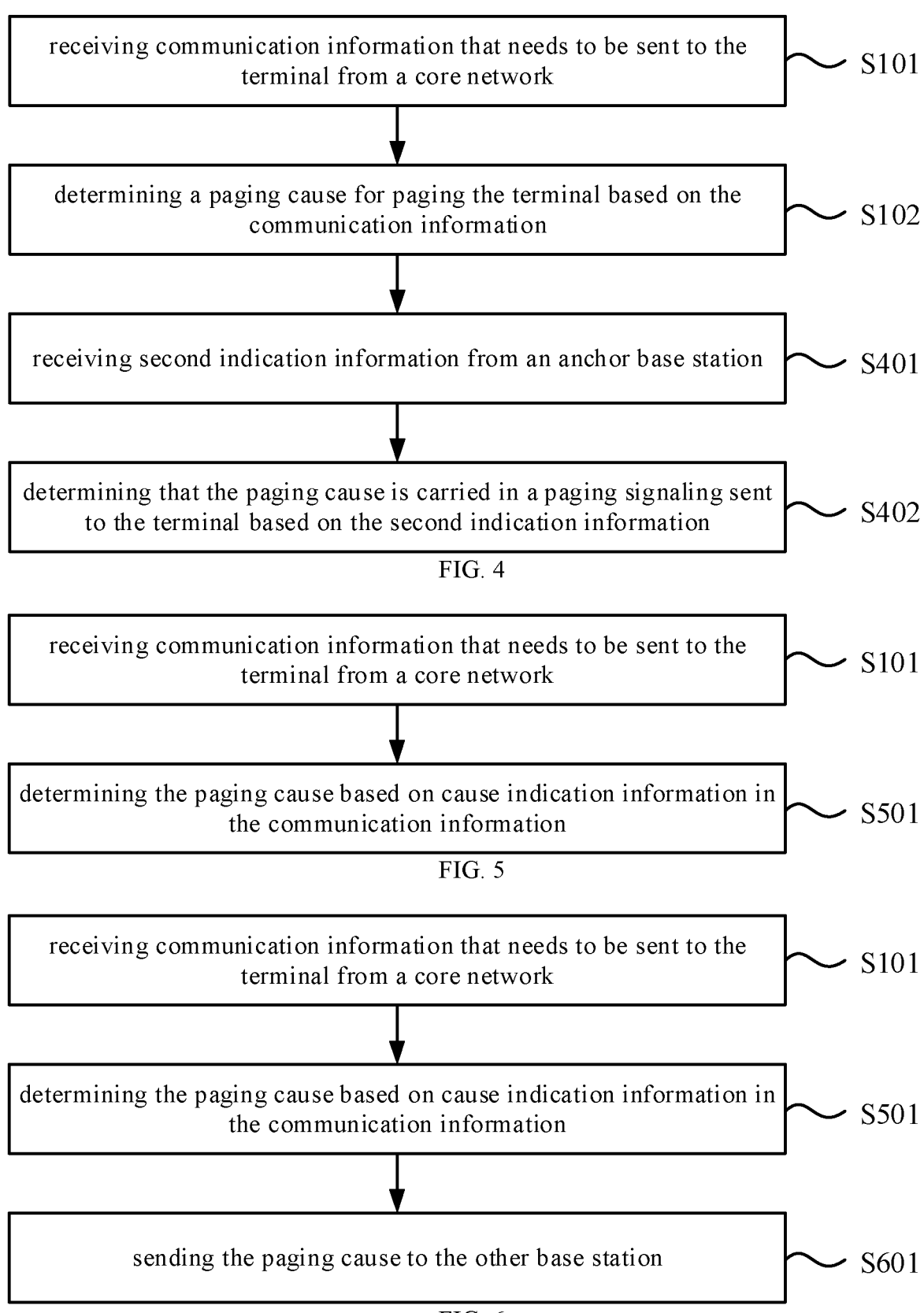

receiving communication information that needs to be sent to the terminal from a core network ~ S101 determining a paging cause for paging the terminal based on the communication information ~ S102 receiving second indication information from an anchor base station ~ S401 determining that the paging cause is carried in a paging signaling sent to the terminal based on the second indication information ~ S402

FIG. 4 receiving communication information that needs to be sent to the terminal from a core network ~ S101 determining the paging cause based on cause indication information in the communication information ~ S501

FIG. 5 receiving communication information that needs to be sent to the terminal from a core network ~ S101 determining the paging cause based on cause indication information in the communication information ~ S501 sending the paging cause to the other base station ~ S601

FIG. 6

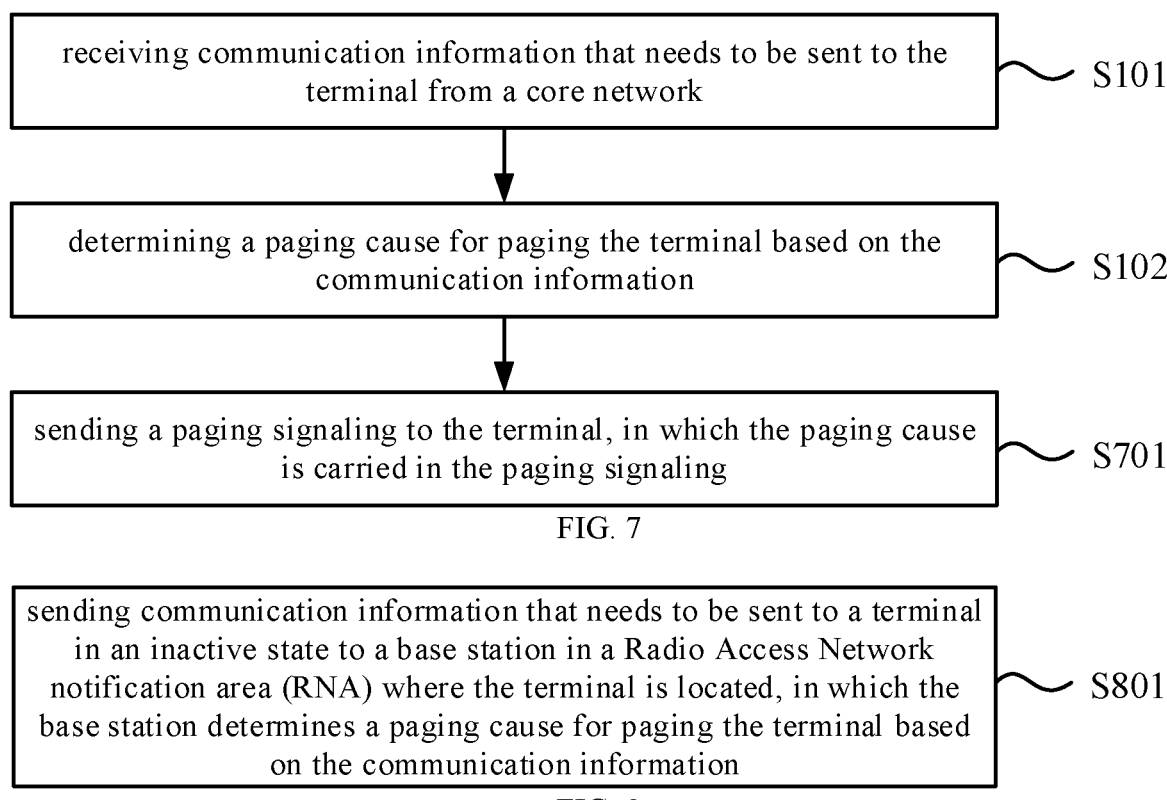

| | |
|---|---|
| receiving communication information that needs to be sent to the terminal from a core network | S101 |
| determining a paging cause for paging the terminal based on the communication information | S102 |
| sending a paging signaling to the terminal, in which the paging cause is carried in the paging signaling | S701 |

FIG. 7

| | |
|---|---|
| sending communication information that needs to be sent to a terminal in an inactive state to a base station in a Radio Access Network notification area (RNA) where the terminal is located, in which the base station determines a paging cause for paging the terminal based on the communication information | S801 |

FIG. 8

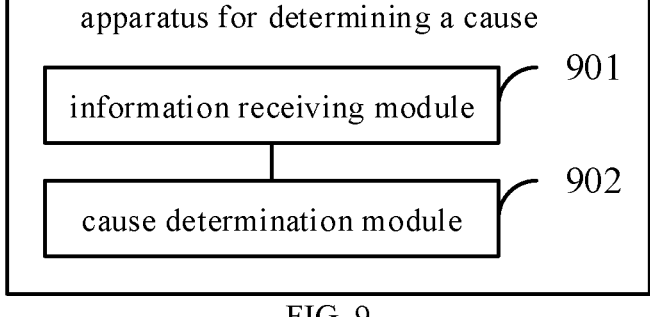

apparatus for determining a cause information receiving module 901 cause determination module 902

FIG. 9 apparatus for determining a cause information receiving module 901 cause determination module 902 first cause sending module 1001

FIG. 10

CAUSE DETERMINATION METHOD AND APPARATUS, AND CAUSE INDICATION METHOD AND APPARATUS

CROSS-REFERENCE TO RELATED APPLICATION

This application is the U.S. National Stage Application of International Application No. PCT/CN2021/091720, filed on Apr. 30, 2021, the entire disclosure of which is incorporated herein by reference in its entirety for all purposes.

TECHNICAL FIELD

The disclosure relates to a field of paging in a wireless communication network, and specifically to a method and an apparatus for determining a paging cause, a method and an apparatus for indicating a paging cause, a communication device and a computer-readable storage medium.

BACKGROUND

With the development of wireless communication technologies, there are more and more multi-card mobile phones in the market. At present, a processing mode of a communication conflict for a multi-card mobile phone is achieved mainly based on each terminal manufacturer, which results in many different terminal behaviors and processing modes (such as, dual-card single-standby, dual-card dual-standby single-pass and dual-card dual-standby dual-pass), and may cause some problems.

For example, a terminal may include different subscriber identity module (SIM). For each SIM card used by the terminal to communicate with a network, and the SIM card receives paging from a network, in which case, the SIM card does not know whether to respond to the paging.

SUMMARY

According to a first aspect of the disclosure, a method for determining a cause is performed by a base station in a Radio Access Network (RAN) notification area (RNA) where a terminal in an inactive state is located. The method includes: receiving communication information that needs to be sent to the terminal from a core network; and determining a paging cause for paging the terminal based on the communication information.

According to a second aspect of the disclosure, a method for indicating a cause is performed by a core network. The method includes: sending communication information that needs to be sent to a terminal in an inactive state, to a base station in a RNA where the terminal is located; in which the communication information is configured for the base station to determine a paging cause for paging the terminal.

According to a third aspect of the present disclosure, a base station in a RNA where a terminal in an inactive state is provided, and includes: a processor; and a memory for storing a computer program. The processor is configured to receive communication information that needs to be sent to the terminal from a core network; and determine a paging cause for paging the terminal based on the communication information.

BRIEF DESCRIPTION OF THE DRAWINGS

In order to explain the technical solutions in embodiments of the present disclosure more clearly, the drawings described in the embodiments will be briefly introduced below. The drawings described as below are only some embodiments of the present disclosure.

FIG. 1 is a flowchart illustrating a method for determining a cause applicable to a base station, according to an embodiment of the present disclosure.

FIG. 2 is a flowchart illustrating another method for determining a cause according to an embodiment of the present disclosure.

FIG. 3 is a flowchart illustrating another method for determining a cause according to an embodiment of the present disclosure.

FIG. 4 is a flowchart illustrating another method for determining a cause according to an embodiment of the present disclosure.

FIG. 5 is a flowchart illustrating another method for determining a cause according to an embodiment of the present disclosure.

FIG. 6 is a flowchart illustrating another method for determining a cause according to an embodiment of the present disclosure.

FIG. 7 is a flowchart illustrating another method for determining a cause according to an embodiment of the present disclosure.

FIG. 8 is a flowchart illustrating a method for indicating a cause according to an embodiment of the present disclosure.

FIG. 9 is a block diagram illustrating an apparatus applicable to a base station for determining a cause according to an embodiment of the present disclosure.

FIG. 10 is a block diagram illustrating another apparatus for determining a cause according to an embodiment of the present disclosure.

DETAILED DESCRIPTION

Figure 11:
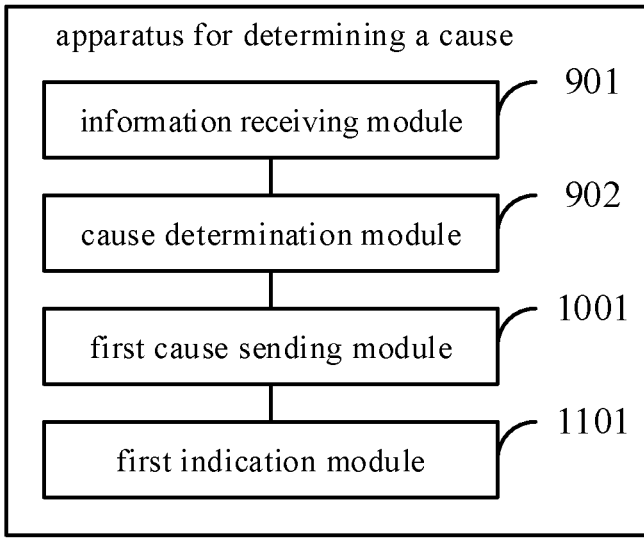
FIG. 11 is a block diagram illustrating another apparatus for determining a cause according to an embodiment of the present disclosure.

The technical solutions in the embodiments of the present disclosure will be described clearly and completely in combination with the appended drawings in the embodiments of the present disclosure. The embodiments described are only a part of embodiments in the present disclosure, rather than all the embodiments.

The terms described in the embodiments of the present disclosure are only for the purpose of describing specific embodiments and are not intended to limit the embodiments of the present disclosure. The singular forms "a/an", "the" used in the embodiments of the disclosure and the appended claim are also intended to include plural forms, unless the context clearly indicates otherwise. It should also be understood that the term "and/or" used in the present disclosure means and includes any or all possible combinations of one or more associated listed items.

It should be understood that, although the terms first, second, third, etc. may be used in the embodiments of the present disclosure to describe various information, such information shall not be limited to these terms. These terms are only used to distinguish the same category of information. For example, without going beyond the scope of the embodiments of the present disclosure, first information may also be referred to as second information, and similarly, second information may also be referred to as first information. It depends on the context. For example, the word "if" as used herein may be interpreted as "in a case that" or "when" or "in response to determining".

The terms used herein are "greater than" or "less than" "higher than" or "lower than" when representing a size relationship for purposes of conciseness and ease of understanding. However, it may be understood for those skilled in the art that the term "greater than" covers the meaning of "greater than or equal to", and "less than" covers the meaning of "less than or equal to"; the term "higher than" covers the meaning of "higher than or equal to", and "lower than" covers the meaning of "lower than or equal to".

FIG. 1 is a flowchart illustrating a method for determining a cause according to an embodiment of the present disclosure. The method for determining a cause as illustrated in the embodiment is applicable to a base station in a Radio Access Network (RAN) notification area (RNA) where a terminal in an inactive state is located. The terminal includes but not limited to a mobile phone, a tablet computer, a wearable device, a sensor, an Internet of things device and other communication device. The terminal as a user equipment (UE) may communicate with a base station. The base station includes but not limited to a 4G base station, a 5G base station, a 6G base station, and other base station in a communication system.

The terminal may be a multi-card terminal, that is, a plurality of SIM cards may be configured in the terminal. The plurality of SIM cards include but are not limited to a first SIM card and a second SIM card. Different SIM cards may belong to different operator networks or the same operator networks.

When the first SIM card is in a communication process, and the second SIM card receives the paging, which belongs to a multi-card conflict, in order to enable the terminal to determine whether to respond to the paging via the second SIM card, a paging cause of the paging may be sent to the terminal, so that the terminal may determine whether communication of the first SIM card should be interrupted based on the paging cause and respond to the paging via the second SIM card, or continues the communication of the first SIM card without responding to the paging via the second SIM card.

In an embodiment, the paging cause may be information related to a service corresponding to the paging, including but not limited to a quality of service (QOS), a priority and a type, etc. of the service, and the terminal may determine corresponding information of a service corresponding to communication of the first SIM card. For example, when the paging cause is a second QoS of the service corresponding to the paging, the terminal may determine a first QoS of the service corresponding to the communication of the first SIM card, and compare the two QoSs. For example, when the first QoS is relatively high, the communication of the first SIM card may be continued without responding to the paging via the second SIM card, and when the second QoS is relatively high, the communication of the first SIM card may be interrupted and the paging may be responded via the second SIM card.

In order to enable the terminal to receive the paging cause, in an embodiment, the paging cause may be sent to the terminal by means of broadcast, or may be sent to the terminal by means of unicast. The following embodiments are mainly described by broadcasting the paging cause. For example, the paging cause of a paging signaling may be carried in the transmitted paging signaling.

For the terminal in the inactive state, the terminal may be moved in a corresponding RNA (e.g., configured by the network to the terminal) without notifying the RAN. The base station that ultimately serves the terminal in the RNA may be referred to as an anchor base station, and the anchor base station indicates the terminal to enter an inactive state.

Specifically for a multi-card terminal, for example, when the second SIM card in the terminal is in the inactive state, the second SIM card may be moved in a corresponding RNA (e.g., configured by the network to the second SIM card) without notifying the RAN. The base station that ultimately serves the second SIM card in the RNA may be referred to as an anchor base station, and the anchor base station indicates the second SIM card to enter an inactive state.

The terminal in the inactive state in all the embodiments of the disclosure may refer to that, for a single-card terminal, the terminal is in the inactive state, for a multi-card terminal, a certain SIM in the terminal is in the inactive state, such as the second SIM card in the terminal being in the inactive state.

As illustrated in FIG. 1, the method for determining a cause may include the following steps S101-S102.

At S101, communication information that needs to be sent to the terminal from a core network is received.

At S102, a paging cause for paging the terminal is determined based on the communication information.

In an embodiment, the core network may send the communication information to the terminal, and the communication information includes but not limited to a signaling or data.

When the terminal is in a non-connected state, the core network may send the communication information to the terminal via the base station in the RNA. For example, the core network may send the communication information to the anchor base station, the anchor base station may further send the communication information to the other base station in the RNA, and the anchor base station and the other base station may send the communication information to the terminal.

Since the terminal is in the non-connected state, in order to send the communication information to the terminal, the base station in the RNA needs to page the terminal first, and the paging cause of the paging may be determined based on the communication information.

According to embodiment of the present disclosure, the base station in the RNA may determine the paging cause based on the communication information after receiving the communication information that needs to be sent by the core network to the terminal in the inactive state, and send the paging cause to the terminal, so that the terminal may resolve a multi-card conflict in the terminal by using the paging cause as needed.

For example, the base station may send the paging cause carried in a paging signaling when sending (for example, broadcasting) the paging signaling to the terminal. The paging cause may be sent to the terminal in other manners as needed, for example, when the second SIM card in the terminal is paged, it is determined that the first SIM card in the terminal is communicating, and the paging cause may be conveyed to the terminal via the base station in communication with the first SIM.

In an embodiment, the base station includes at least one of: an anchor base station of the terminal in the RNA or other base station than the anchor base station in the RNA. The core network may send the communication information to the anchor base station, the anchor base station may further send the communication information to the other base station in the RNA, and the anchor base station and the other base station may send the communication information to the terminal.

FIG. 2 is a flowchart illustrating another method for determining a cause according to an embodiment of the present disclosure. As illustrated in FIG. 2, determining the paging cause for paging the terminal based on the communication information includes the following step S201.

At S201, the paging cause is determined based on a type of a signaling in the communication information and/or a quality of service of data in the communication information.

In an embodiment, when the communication information includes a signaling, the core network may carry the type of the signaling in the communication information. When the communication information includes data, the core network may carry the QoS of data in the communication information (for example, the QoS required by the service corresponding to the data).

The base station may determine the paging cause based on the type of the signaling or determine the paging cause based on the QoS of data. For example, when the paging cause is a priority of the service corresponding to the paging, the importance of the signaling may be determined based on the type of the signaling. The higher the importance, the higher the corresponding priority, and similarly, the higher the QoS of data, the higher the priority.

FIG. 3 is a flowchart illustrating another method for determining a cause according to an embodiment of the present disclosure. As illustrated in FIG. 3, when the base station is the anchor base station, the method further includes the following step S301.

At S301, the paging cause is sent to the other base station.

In an embodiment, when the base station is the anchor base station, the anchor base station determines the paging cause based on the communication information. After the anchor base station determines the paging cause, the anchor base station may send the paging cause to the other base station, so that the other base station may not need to determine the paging cause again, which is beneficial to saving resources of the other base station.

In an embodiment, the method further includes: receiving, by the other base station, the paging cause from the anchor base station, and carrying the paging cause in a paging signaling sent to the terminal.

In an embodiment, the method further includes: sending first indication information to the other base station, in which the first indication information is configured to indicate the other base station to carry the paging cause in a paging signaling sent to the terminal.

In an embodiment, the anchor base station may send the first indication information to the other base station, explicitly indicating the other base station to carry the paging cause in the paging signaling sent to the terminal, so that the other base station may carry the paging cause in the paging signaling when sending the paging signaling to the terminal.

The other base station may agree in advance with the anchor base station or predetermine based on a protocol that, in a situation where the paging cause from the anchor base station is received, the paging cause is carried in the paging signaling when the paging signaling is sent to the terminal subsequently. In such case, after the other base station receives the paging cause from the anchor base station, the paging cause may be carried in the paging signaling sent to the terminal, so that the anchor base station does not need to indicate the other base station, which is beneficial to saving communication resources.

It needs to be noted that, in all the embodiments of the disclosure, the anchor base station may send information (such as a paging cause, communication information, and so on) to the other base station via an interface between base stations. The sent information is carried in the paging signaling in the RAN, so that the information is transmitted to the other base station.

FIG. 4 is a flowchart illustrating another method for determining a cause according to an embodiment of the present disclosure. As illustrated in FIG. 4, when the base station is the other base station, the method further includes the following steps S401-S402.

At S401, second indication information from the anchor base station is received.

At S402, it is determined that the paging cause is carried in a paging signaling sent to the terminal based on the second indication information.

In an embodiment, when the other base station in the RNA determines the paging cause based on the communication information, the anchor base station may not need to send the paging cause to the other base station, but may send the second indication information to the other base station, and indicate the other base station to carry the paging cause in the paging signaling sent to the terminal via the second indication information.

When the other base station in the RNA determines the paging cause based on the communication information, the other base station may agree in advance with the anchor base station or predetermine based on a protocol that, in a situation where the paging cause from the anchor base station is received, the paging cause is carried in the paging signaling when the paging signaling is sent to the terminal subsequently. In such case, the anchor base station does not need to indicate the other base station, which is beneficial to saving communication resources.

FIG. 5 is a flowchart illustrating another method for determining a cause according to an embodiment of the present disclosure. As illustrated in FIG. 5, determining the paging cause for paging the terminal based on the communication information includes the following step S501.

At S501, the paging cause is determined based on cause indication information in the communication information.

In an embodiment, the core network may determine the paging cause based on the communication information, which is similar with the above embodiments, which will not be repeated here.

Then, the cause indication information is generated based on the paging cause, such as an identification, a serial number and the like of the paging cause, and the cause indication information is further sent to the base station in the RNA, so that the base station in the RNA may determine the paging cause directly based on the cause indication information after receiving the communication information, without a need of determining the paging cause based on the communication information, which is beneficial to saving resources of the base station.

It needs to be noted that, the base station in the RNA may not need to determine the paging cause based on the communication information in a case that the cause indication information is received, and may determine the paging cause based on the communication information in a case that the cause indication information is not received.

FIG. 6 is a flowchart illustrating another method for determining a cause according to an embodiment of the present disclosure. As illustrated in FIG. 6, when the base station is the anchor base station, the method further includes the following step S601.

At S601, the paging cause is sent to the other base station.

In an embodiment, the core network may send cause indication information to the anchor base station, and the anchor base station sends the cause indication information to the other base station.

In an embodiment, the method further includes: receiving, by the other base station, the paging cause from the anchor base station, and carrying the paging cause in a paging signaling sent to the terminal.

In an embodiment, the method further includes:

sending third indication information to the other base station. The third indication information is configured to indicate the other base station to carry the paging cause in a paging signaling sent to the terminal.

In an embodiment, the anchor base station may send the third indication information to the other base station, explicitly indicating the other base station to carry the paging cause in the paging signaling sent to the terminal, so that the other base station may carry the paging cause in the paging signaling when sending the paging signaling to the terminal.

The other base station may agree in advance with the anchor base station or predetermine based on a protocol that, in a situation where the paging cause from the anchor base station is received, the paging cause is carried in the paging signaling when the paging signaling is sent to the terminal subsequently. In such case, after the other base station receives the paging cause from the anchor base station, the paging cause may be carried in the paging signaling sent to the terminal, so that the anchor base station does not need to indicate the other base station, which is beneficial to saving communication resources.

FIG. 7 is a flowchart illustrating another method for determining a cause according to an embodiment of the present disclosure. As illustrated in FIG. 7, the method further includes the following step S701.

At S701, a paging signaling is sent to the terminal (such as via broadcast, unicast, multicast). The paging cause is carried in the paging signaling.

In an embodiment, the anchor base station in the RNA and the other base station may send the paging signaling to the terminal, and carry the paging cause in the paging signaling, so that the terminal may determine the paging cause when receiving the paging signaling, and thus the terminal resolves a multi-card conflict based on the paging cause.

In an embodiment, it may be set as needed a way that the terminal resolves the multi-card conflict based on the paging cause. For example, when the terminal receives the paging by using the second SIM card, and communicates with a base station by using the first SIM card, and the paging cause is a second priority of the service corresponding to the paging, the terminal may determine a first priority of the service corresponding to communication between the first SIM card and the base station, and compare the first priority with the second priority of the service corresponding to the paging. For example, when the first priority is relatively high, the communication of the first SIM card may be continued without responding to the paging via the second SIM card, and when the second priority is relatively high, the communication of the first SIM card may be interrupted and the paging may be responded via the second SIM card.

FIG. 8 is a flowchart illustrating a method for indicating a cause according to an embodiment of the present disclosure. The method for indicating a cause as illustrated in the embodiment is applicable to a core network. The core network may communicate with the base station or may communicate with the terminal. The terminal includes but not limited to a mobile phone, a tablet computer, a wearable device, a sensor, an Internet of things device and other communication device. The terminal as a user equipment (UE) may communicate with a base station. The base station includes but not limited to a 4G base station, a 5G base station, a 6G base station, and other base station in a communication system.

As illustrated in FIG. 8, the method for indicating a cause includes the following step S801.

At S801, communication information that needs to be sent to a terminal in an inactive state, is sent to a base station in a Radio Access Network (RAN) notification area (RNA) where the terminal is located. The base station determines a paging cause for paging the terminal based on the communication information.

In an embodiment, the core network sends the communication information to the terminal, and the communication information includes but not limited to a signaling or data.

When the terminal is in a non-connected state, the core network may send the communication information to the terminal via the base station in the RNA. For example, the core network may send the communication information to the anchor base station, the anchor base station may further send the communication information to the other base station in the RNA, and the anchor base station and the other base station may send the communication information to the terminal.

Since the terminal is in the non-connected state, in order to send the communication information to the terminal, the base station in the RNA needs to page the terminal first, and the paging cause of the paging may be determined based on the communication information.

According to the embodiment of the present disclosure, the base station in the RNA may determine the paging cause based on the communication information after receiving the communication information that needs to be sent by the core network to the terminal in the inactive state, and send the paging cause to the terminal, so that the terminal may resolve a multi-card conflict in the terminal by using the paging cause as needed.

In an embodiment, the base station includes at least one of: an anchor base station of the terminal in the RNA or other base station than the anchor base station in the RNA. The core network may send the communication information to the anchor base station, the anchor base station may further send the communication information to the other base station in the RNA, and the anchor base station and the other base station may send the communication information to the terminal.

In an embodiment, when the base station is an anchor base station, the anchor base station sends the paging cause determined to the other base station.

In an embodiment, when the base station determines the paging cause based on the communication information, the anchor base station may send the paging cause to the other base station in response to determining the paging cause, so that the other base station does not need to determine the paging cause again, which is beneficial to saving resources of the other base station.

In an embodiment, when the other base station in the RNA determines the paging cause based on the communication information, the anchor base station may not need to send the paging cause to the other base station, but may send the second indication information to the other base station, and indicate the other base station to carry the paging cause in the paging signaling sent to the terminal via the second indication information.

In an embodiment, when the base station is the anchor base station, the method further includes following steps.

Fourth indication information is sent to the anchor base station. The fourth indication information is configured to indicate the anchor base station to send the paging cause determined to the other base station.

In an embodiment, when the anchor base station determines the paging cause for paging the terminal based on the communication information, the core network may inform the anchor base station via the fourth indication information, and send the paging cause determined to the other base station, to avoid the other base station from redetermining the paging cause, which is beneficial to saving resources of the other base station.

In an embodiment, the method further includes: determining the paging cause based on the communication information, and generating cause indication information based on the paging cause; and sending the cause indication information to the base station. The cause indication information is configured for the base station to determine the paging cause.

In an embodiment, the core network may determine the paging cause based on the communication information, which is similar with the above embodiments, which will not be repeated here.

Then, the cause indication information is generated based on the paging cause, such as an identification, a serial number and the like of the paging cause, and the cause indication information is further sent to the base station in the RNA, so that the base station in the RNA may determine the paging cause directly based on the cause indication information after receiving the communication information, without a need of determining the paging cause based on the communication information, which is beneficial to saving resources of the base station.

Corresponding to the embodiments of the method for determining a cause and the method for indicating a cause, the embodiments about an apparatus for determining a cause and an apparatus for indicating a cause are provided in the disclosure.

FIG. 9 is a block diagram illustrating an apparatus for determining a cause according to an embodiment of the present disclosure. The apparatus for determining a cause as illustrated in the embodiment is applicable to a base station in a RNA where a terminal in an inactive state is located. The terminal includes but not limited to a mobile phone, a tablet computer, a wearable device, a sensor, an Internet of things device and other communication device. The terminal as a UE may communicate with a base station. The base station includes but not limited to a 4G base station, a 5G base station, a 6G base station, and other base station in a communication system.

As illustrated in FIG. 9, the apparatus includes an information receiving module 901 and a cause determination module 902.

The information receiving module 901 is configured to receive communication information that needs to be sent to the terminal from a core network.

The cause determination module 902 is configured to determine a paging cause for paging the terminal based on the communication information.

In an embodiment, the base station includes at least one of: an anchor base station of the terminal in the RNA or other base station than the anchor base station in the RNA.

In an embodiment, the cause determination module is configured to determine the paging cause based on a type of a signaling in the communication information and/or a QoS of data in the communication information.

FIG. 10 is a block diagram illustrating another apparatus for determining a cause according to an embodiment of the present disclosure. As illustrated in FIG. 10, when the base station is the anchor base station, the apparatus further includes a first cause sending module 1001.

The first cause sending module 1001 is configured to send the paging cause to the other base station.

In an embodiment, the other base station receives the paging cause from the anchor base station, and carries the paging cause in a paging signaling sent to the terminal.

FIG. 11 is a block diagram illustrating another apparatus for determining a cause according to an embodiment of the present disclosure. As illustrated in FIG. 11, the apparatus further includes a first indication module 1101.

The first indication module 1101 is configured to send first indication information to the other base station. The first indication information is configured to indicate the other base station to carry the paging cause in a paging signaling sent to the terminal.

Figure 12:
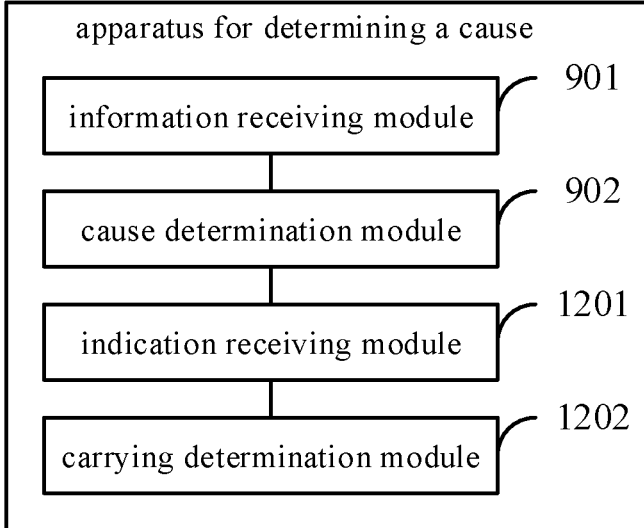
FIG. 12 is a block diagram illustrating another apparatus for determining a cause according to an embodiment of the present disclosure.

FIG. 12 is a block diagram illustrating another apparatus for determining a cause according to an embodiment of the present disclosure. As illustrated in FIG. 12, when the base station is the other base station, the apparatus further includes an indication receiving module 1201 and a carrying determination module 1202.

The indication receiving module 1201 is configured to receive second indication information from the anchor base station.

The carrying determination module 1202 is configured to determine that the paging cause is carried in a paging signaling sent to the terminal based on the second indication information.

In an embodiment, the cause determination module is configured to determine the paging cause based on the cause indication information in the communication information.

Figure 13:
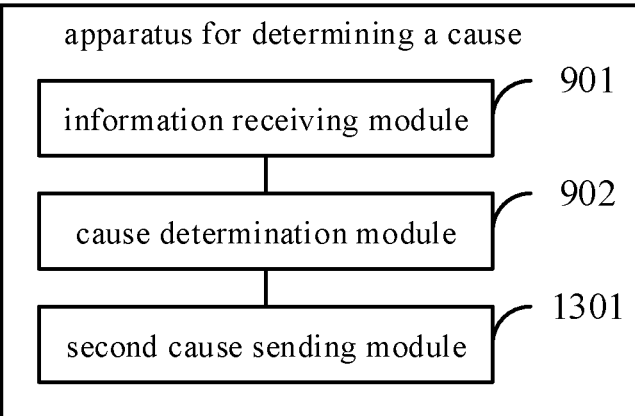
FIG. 13 is a block diagram illustrating another apparatus for determining a cause according to an embodiment of the present disclosure.

FIG. 13 is a block diagram illustrating another apparatus for determining a cause according to an embodiment of the present disclosure. As illustrated in FIG. 13, when the base station is the anchor base station, the apparatus further includes a second cause sending module 1301.

The second cause sending module 1301 is configured to send the paging cause to the other base station.

In an embodiment, the other base station receives the paging cause from the anchor base station, and carries the paging cause in a paging signaling sent to the terminal.

Figure 14:
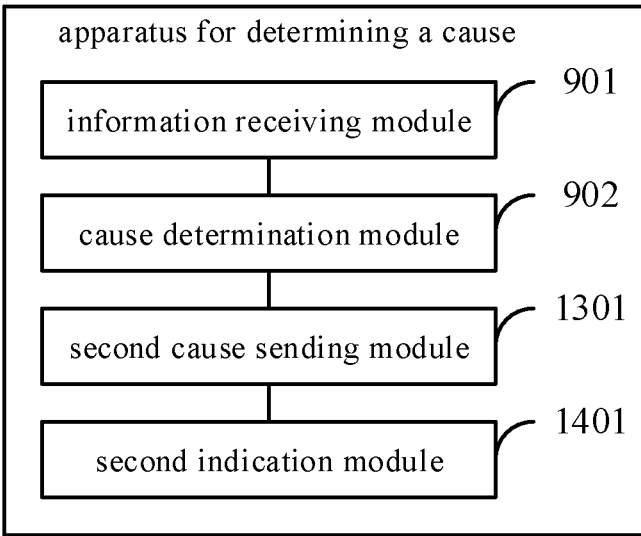
FIG. 14 is a block diagram illustrating another apparatus for determining a cause according to an embodiment of the present disclosure.

FIG. 14 is a block diagram illustrating another apparatus for determining a cause according to an embodiment of the present disclosure. As illustrated in FIG. 14, the apparatus further includes a second indication module 1401.

The second indication module 1401 is configured to send third indication information to the other base station. The third indication information is configured to indicate the other base station to carry the paging cause in the paging signaling sent to the terminal.

Figure 15:
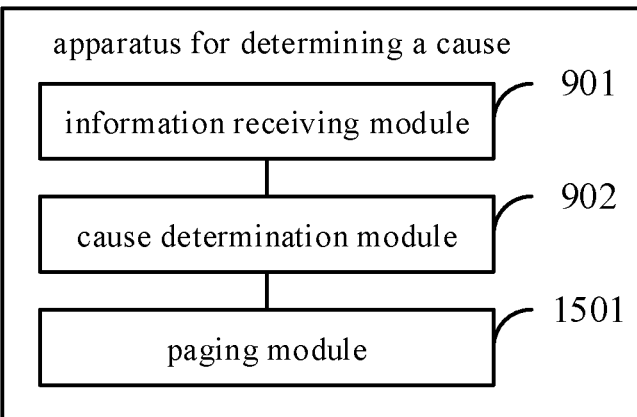
FIG. 15 is a block diagram illustrating another apparatus for determining a cause according to an embodiment of the present disclosure.

FIG. 15 is a block diagram illustrating another apparatus for determining a cause according to an embodiment of the present disclosure. As illustrated in FIG. 15, the apparatus further includes a paging module 1501.

The paging module 1501 is configured to send a paging signaling to the terminal. The paging cause is carried in the paging signaling.

Figure 16:
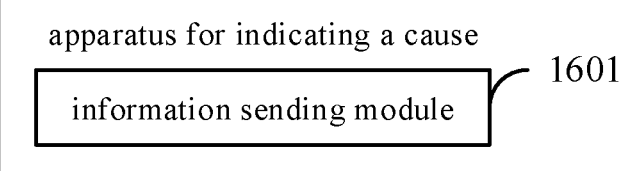
FIG. 16 is a block diagram illustrating an apparatus applicable to a core network for indicating a cause according to an embodiment of the present disclosure.

FIG. 16 is a block diagram illustrating an apparatus for indicating a cause according to an embodiment of the present disclosure. The apparatus for indicating a cause as illustrated in the embodiment is applicable to a core network. The core network may communicate with the base station or may communicate with the terminal. The terminal includes but not limited to a mobile phone, a tablet computer, a wearable device, a sensor, an Internet of things device and other communication device. The terminal as a UE may communicate with a base station. The base station includes but not limited to a 4G base station, a 5G base station, a 6G base station and other base station in a communication system.

As illustrated in FIG. 16, the apparatus for indicating a cause includes an information sending module 1601.

The information sending module 1601 is configured to send communication information that needs to be sent to a terminal in an inactive state to a base station in a RNA where the terminal is located. The base station determines a paging cause for paging the terminal based on the communication information.

In an embodiment, the base station includes at least one of: an anchor base station of the terminal in the RNA or other base station than the anchor base station in the RNA.

In an embodiment, when the base station is an anchor base station, the anchor base station sends the paging cause determined to the other base station.

Figure 17:
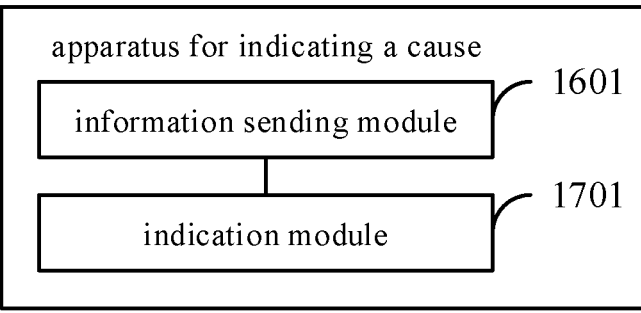
FIG. 17 is a block diagram illustrating another apparatus for indicating a cause according to an embodiment of the present disclosure.

FIG. 17 is a block diagram illustrating another apparatus for indicating a cause according to an embodiment of the present disclosure. As illustrated in FIG. 17, when the base station is the anchor base station, the apparatus further includes an indication module 1701.

The indication module 1701 is configured to send fourth indication information to the anchor base station. The fourth indication information is configured to indicate the anchor base station to send the paging cause determined to the other base station.

In an embodiment, the apparatus further includes: an indication determination module, configured to determine the paging cause based on the communication information, and generate cause indication information based on the paging cause; and a cause sending module, configured to send the cause indication information to the base station. The cause indication information is configured for the base station to determine the paging cause.

With regard to the apparatus in the above embodiments, the specific way each module performs the operation has been described in detail in the embodiments of the method and will not be elaborated here.

For the embodiments of the apparatus, the related descriptions may refer to a part of the description of embodiments of the method since they correspond to the embodiments of the method. The embodiments of the apparatus described above are only exemplary, in which the above modules described as separate parts may or may not be physically separated, the parts shown as modules may or may not be physical modules, that is, may be located in one place, or may be distributed on a plurality of network modules. Some or all of the modules may be selected according to the actual needs to achieve the purpose of the present disclosure. Those skilled in the art may understand and implement it without any creative efforts.

According to an embodiment of the present disclosure, a communication device is provided, and includes: a processor; and a memory for storing a computer program. When the computer program is executed by the processor, the method for determining a cause as described in the above any one embodiment is implemented.

According to an embodiment of the present disclosure, a communication device is provided, and includes: a processor; and a memory for storing a computer program. When the computer program is executed by the processor, the method for indicating a cause as described in the above any one embodiment is implemented.

According to an embodiment of the present disclosure, a computer-readable storage medium for storing a computer program is provided. When the computer program is executed by a processor, steps of the method for determining a cause as described in the above any one embodiment are implemented.

According to an embodiment of the present disclosure, a computer-readable storage medium for storing a computer program is provided. When the computer program is executed by a processor, steps of the method for indicating a cause as described in the above any one embodiment are implemented.

According to the embodiments of the present disclosure, the base station in the RNA may determine the paging cause based on the communication information in response to receiving the communication information that needs to be sent by the core network to the terminal in the inactive state, and send the paging cause to the terminal, so that the terminal may resolve a multi-card conflict in the terminal by using the paging cause as needed.

Figure 18:
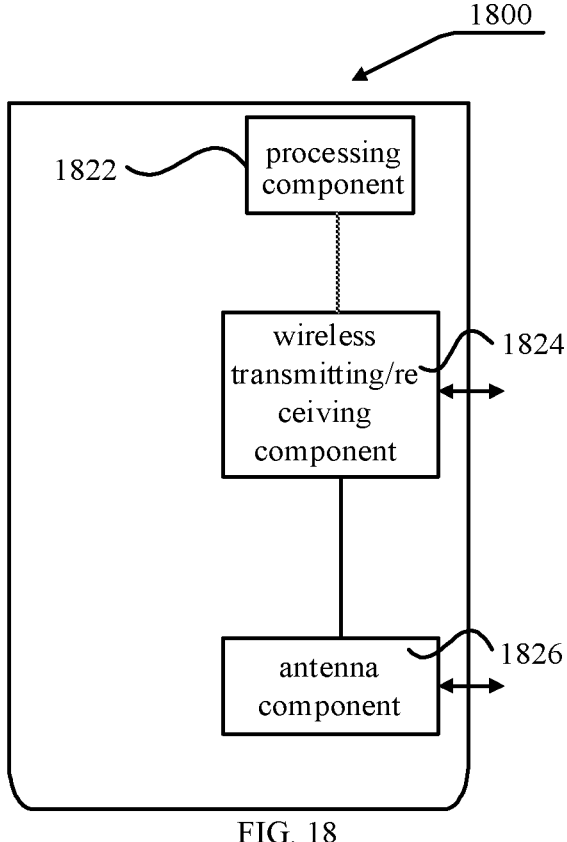
FIG. 18 is a block diagram illustrating an apparatus for determining a cause according to an embodiment of the present disclosure.

FIG. 18 is a block diagram illustrating a device 1800 for determining a cause according to an embodiment of the present disclosure. The device 1800 may be provided as a base station. As illustrated in FIG. 18, the device 1800 includes a processing component 1822, a wireless transmitting/receiving component 1824, an antenna component 1826, and a signal processing unit peculiar to a wireless interface, and the processing component 1822 may further include one or more processors. One of the processors in the processing component 1822 may be configured to implement the method for determining a cause in the above any one embodiment.

Figure 19:
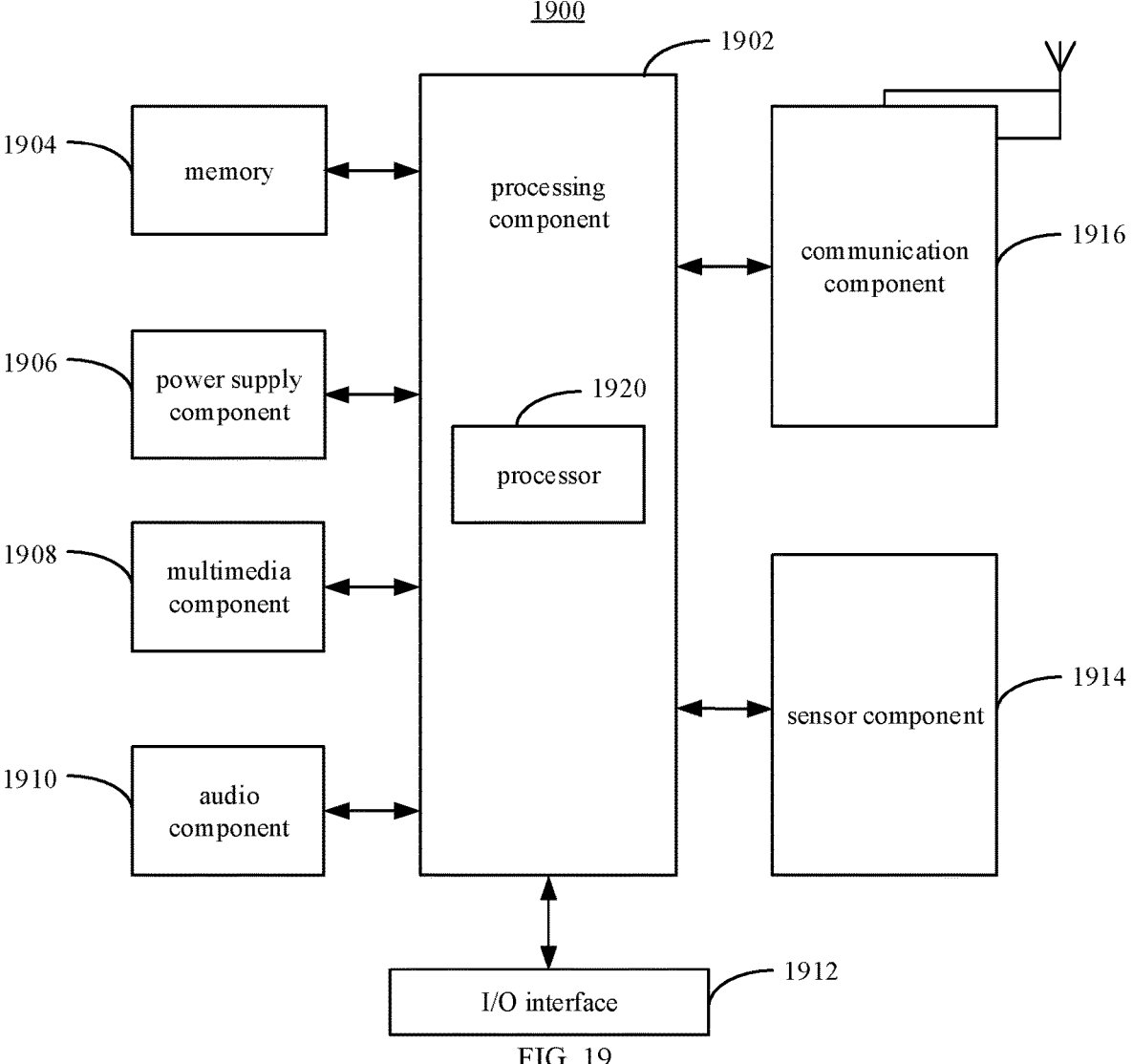
FIG. 19 is a block diagram illustrating a terminal according to an embodiment of the present disclosure.

FIG. 19 is a block diagram illustrating a terminal 1900 according to an embodiment of the present disclosure. For example, the terminal 1900 may be a mobile phone, a computer, a digital broadcasting terminal, a messaging device, a game console, a tablet device, a medical device, a fitness equipment, a personal digital assistant, etc.

As illustrated in FIG. 19, the terminal 1900 may include one or more components: a processing component 1902, a memory 1904, a power supply component 1906, a multimedia component 1908, an audio component 1910, an input/output (I/O) interface 1912, a sensor component 1914, and a communication component 1916.

The processing component 1902 generally controls the whole operation of the terminal 1900, such as the operations related to display, a phone call, data communication, a camera operation and a recording operation. The processing component 1902 may include one or more processors 1920 to execute instructions, so as to communicate with the base station that completes its own internal operations or performs the above methods. In addition, the processing component 1902 may include one or more modules for the convenience of interaction between the processing component 1902 and other components. For example, the processing component 1902 may include a multimedia module for the convenience of interaction between the multimedia component 1908 and the processing component 1902.

The memory 1904 is configured to store all types of data to support the operation of terminal 1900. Examples of the data include the instructions of any applications or methods operated on the terminal 1900, contact data, phone book data, messages, pictures, videos, etc. The memory 1904 may be implemented by any type of volatile or non-volatile storage devices or their combination, such as a static random access memory (SRAM), an electrically erasable programmable read-only memory (EEPROM), an erasable programmable read-only (EPROM), a programmable read-only memory (PROM), a read-only memory (ROM), a magnetic memory, a flash memory, a magnetic disk or an optical disk.

The power supply component 1906 may provide power supply for all components of the terminal 1900. The power supply component 1906 may include a power supply management system, one or more power supplies, and other components related to generating, managing and distributing power for the terminal 1900.

The multimedia component 1908 includes an output interface screen provided between the terminal 1900 and the user. In some embodiments, the screen may include a liquid crystal display (LCD) and a touch panel (TP). When the screen includes a touch panel, the screen may be implemented as a touch screen to receive input signals from the user. The touch panel includes one or more touch sensors to sense touch, slide and gestures on the touch panel. The touch sensor may not only sense the boundary of touch or slide action, but also detect the duration and pressure related to the touch or slide operation. In some embodiments, the multimedia component 1908 includes a front camera and/or a rear camera. When the terminal 1900 is in an operation mode, such as a shooting mode or a video mode, the front camera and/or the rear camera may receive the external multimedia data. Each front camera and rear camera may be a fixed optical lens system or an optical lens system with a focal length and an optical zoom capacity.

The audio component 1910 is configured as an output and/or input signal. For example, the audio component 1910 includes a microphone (MIC). When the terminal 1900 is in an operation mode, such as a call mode, a record mode, and a speech recognition mode, the microphone is configured to receive external audio signals. The audio signals received may be further stored in the memory 1904 or sent via the communication component 1916. In some embodiments, the audio component 1910 further includes a speaker configured to output an audio signal.

The I/O interface 1912 provides an interface between the processing component 1902 and the peripheral interface module, and the peripheral interface module may be a keyboard, a click wheel, a button, etc. The buttons may include but not limited to a home button, a volume button, a start button and a lock button.

The sensor component 1914 includes one or more sensors, configured to provide various aspects of status assessment for the terminal 1900. For example, the sensor component 1914 may detect an on/off state of the terminal 1900 and a relative positioning of the component. For example, the component is the display and the keypad of the terminal 1900, the sensor component 1914 may also detect a location change of the terminal 1900 or one component of the terminal 1900, a presence or absence of contact between the user and the terminal 1900, an orientation or acceleration/deceleration of the terminal 1900, and a temperature change of the terminal 1900. The sensor component 1914 may include a proximity sensor, which is configured to detect the existence of the objects nearby without any physical contact. The sensor component 1914 may further include a light sensor such as a CMOS or CCD image sensor, which is used in imaging applications. In some embodiments, the sensor component 1914 may further include an acceleration transducer, a gyroscope sensor, a magnetic sensor, a pressure sensor or a temperature sensor.

The communication component 1916 may be configured for the convenience of wired or wireless communication between the terminal 1900 and other devices. The terminal 1900 may access wireless networks based on communication standards, such as WiFi, 2G or 3G, 4G LTE, 5G NR or their combination. In an exemplary embodiment, the communication component 1916 receives broadcast signals or broadcast-related information from an external broadcast management system via a broadcast channel. In an exemplary embodiment, the communication component 1916 further includes a near field communication (NFC) module to facilitate short-range communication. For example, the NFC module may be implemented based on a radio frequency identification (RFID) technology, an infrared data association (IRDA) technology, an ultra-wideband (UWB) technology, a bluetooth (BT) technology and other technologies.

In an exemplary embodiment, the terminal 1900 may be implemented by one or more application specific integrated circuits (ASIC), digital signal processors (DSP), digital signal processing devices (DSPD), programmable logic devices (PLD), field programmable gate arrays (FPGA), controllers, micro control units (MCUs), microprocessors or other electronics components.

In an exemplary embodiment, a non-transitory computer-readable storage medium including instructions is further provided, such as the memory 1904 including instructions, and the instructions may be executed by the processor 1920 of the terminal 1900 to communicate with the base station that complete its own internal operations or performs the above methods. For example, the non-transitory computer-readable storage medium may be a ROM, a random access memory (RAM), a CD-ROM, a magnetic tape, a floppy disk, an optical data storage device, etc.

After considering the specification and practicing the disclosure herein, those skilled in the art will easily think of other embodiments of the present disclosure. The present disclosure is intended to cover any variations, usages, or adaptive changes of the present disclosure. These variations, usages, or adaptive changes follow the general principles of the present disclosure and include common knowledge or conventional technical means in the technical field not disclosed by the present disclosure. The description and the embodiments are to be regarded as exemplary only, and the true scope of the present disclosure are given by the appended claims.

It should be understood that the present disclosure is not limited to the precise structure described above and shown in the drawings, and various modifications and changes may be made without departing from its scope. The scope of the present disclosure is only limited by the appended claims.

It should be noted that relational terms such as first and second are used herein to distinguish one entity or operation from another entity or operation without necessarily requiring or implying any actual relationship or order between such entities or operations. The terms "comprise/comprising", "include/including" or any other variations of them, are intended to cover a non-exclusive inclusion, such that a process, a method, an article or a device including a series of elements not only includes those elements but also includes other elements not expressly listed, or may further include elements inherent to such process, method, article, or device. In the absence of more constraints, the elements defined by a sentence "comprising/including one . . . " do not preclude the presence of additional same elements in the process, method, article, or apparatus that includes the elements.

The above are detailed descriptions of embodiments of the present disclosure. Specific examples are applied to elaborate principles and implementations of the present disclosure. The descriptions of the above embodiments are only used to help understand the method and core concepts of the present disclosure. At the same time, for those skilled in the art, there may be changes in the specific implementation and application scope according to the concepts of the present disclosure. In summary, the contents of the description should not be construed as a limitation of the present disclosure.

What is claimed is:

1. A method for determining a cause, performed by a base station in a Radio Access Network (RAN) notification area (RNA) where a terminal in an inactive state is located, the terminal comprising a first subscriber identity module, SIM, card and a second SIM card, the method comprising:

in a case of communicating via the first SIM card, receiving communication information that needs to be sent to the second SIM card from a core network;

determining a paging cause for paging the second SIM card based on a type of a signaling in the communication information, wherein the paging cause is a priority of a service corresponding to paging, the type of the signaling is configured to determine importance of the signaling, the higher the importance, the higher the corresponding priority; and sending the paging cause to the terminal, wherein the paging cause is used by the terminal to determine whether to respond to the paging via the second SIM card.

2. The method according to claim 1, wherein the base station comprises at least one of:

an anchor base station of the terminal in the RNA, or other base station than the anchor base station in the RNA.

3. The method according to claim 2, wherein when the base station is the anchor base station, the method further comprises:

sending the paging cause to the other base station.

4. The method according to claim 3, further comprising:

receiving, by the other base station, the paging cause from the anchor base station, and carrying the paging cause in a paging signaling sent to the terminal.

5. The method according to claim 3, further comprising:

sending first indication information to the other base station, wherein the first indication information is configured to indicate the other base station to carry the paging cause in a paging signaling sent to the terminal.

6. The method according to claim 2, wherein when the base station is the other base station, the method further comprises:

receiving second indication information from the anchor base station; and determining that the paging cause is carried in a paging signaling sent to the terminal based on the second indication information.

7. The method according to claim 2, wherein determining the paging cause for paging the second SIM card based on the communication information comprises:

determining the paging cause based on cause indication information in the communication information.

8. The method according to claim 7, wherein when the base station is the anchor base station, the method further comprises:

sending the paging cause to the other base station.

9. The method according to claim 8, further comprising:

receiving, by the other base station, the paging cause from the anchor base station, and carrying the paging cause in a paging signaling sent to the terminal; or sending third indication information to the other base station, wherein the third indication information is configured to indicate the other base station to carry the paging cause in a paging signaling sent to the terminal.

10. The method according to claim 1, further comprising:

sending a paging signaling to the terminal, wherein the paging cause is carried in the paging signaling.

11. A non-transitory computer-readable storage medium for storing a computer program, wherein when the computer program is executed by a processor, steps of the method of claim 1 are implemented.

12. A method for indicating a cause, performed by a core network, the method comprising:

sending communication information that needs to be sent to a second SIM card of a terminal in an inactive state, to a base station in a Radio Access Network (RAN) notification area (RNA) where the terminal is located, wherein the terminal comprises a first SIM card and the second SIM card, and the terminal communicates via the first SIM card;

wherein a type of a signaling in the communication information is configured for the base station to determine a paging cause for paging the second SIM card, and the paging cause is sent by the base station to the terminal; wherein the paging cause is a priority of a service corresponding to paging, the type of the signaling is configured to determine importance of the signaling, the higher the importance, the higher the corresponding priority; wherein the paging cause is used by the terminal to determine whether to respond to the paging via the second SIM card.

13. The method according to claim 12, wherein the base station comprises at least one of:

an anchor base station of the terminal in the RNA or an other base station than the anchor base station in the RNA.

14. The method according to claim 13, wherein when the base station is the anchor base station, the paging cause determined is sent by the anchor base station to an other base station.

15. The method according to claim 14, wherein when the base station is the anchor base station, the method further comprises:

sending fourth indication information to the anchor base station, wherein the fourth indication information is configured to indicate the anchor base station to send the paging cause determined to the other base station.

16. The method according to claim 12, comprising:

determining the paging cause based on the communication information, and generating cause indication information based on the paging cause; and sending the cause indication information to the base station, wherein the cause indication information is configured for the base station to determine the paging cause.

17. A communication device, comprising:

a processor; and a memory for storing a computer program;

wherein when the computer program is executed by the processor, the method of claim 12 is implemented.

18. A non-transitory computer-readable storage medium for storing a computer program, wherein when the computer program is executed by a processor, steps of the method of claim 12 are implemented.

19. A base station in a Radio Access Network (RAN) notification area (RNA) where a terminal in an inactive state is located, the terminal comprising a first subscriber identity module, SIM, card and a second SIM card, comprising:

a processor; and a memory for storing a computer program;

wherein the processor is configured to:

in a case of communicating via the first SIM card, receive communication information that needs to be sent to the second SIM card from a core network;

determine a paging cause for paging the second SIM card based on a type of a signaling in the communication information, wherein the paging cause is a priority of a service corresponding to paging, the type of the signaling is configured to determine importance of the signaling, the higher the importance, the higher the corresponding priority; and send the paging cause to the terminal, wherein the paging cause is used by the terminal to determine whether to respond to the paging via the second SIM card.

* * * * *